United States Patent
Zeng

(10) Patent No.: US 8,257,852 B2
(45) Date of Patent: Sep. 4, 2012

(54) BATTERY COVER MECHANISM

(75) Inventor: Xian-Jun Zeng, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 418 days.

(21) Appl. No.: 12/604,929

(22) Filed: Oct. 23, 2009

(65) Prior Publication Data

US 2010/0159312 A1 Jun. 24, 2010

(30) Foreign Application Priority Data

Dec. 22, 2008 (CN) .......................... 2008 1 0306421

(51) Int. Cl.
*H01M 2/10* (2006.01)
(52) U.S. Cl. .............................. 429/97; 429/100; 429/96
(58) Field of Classification Search ............. 429/96–100
See application file for complete search history.

(56) References Cited

U.S. PATENT DOCUMENTS

| 4,391,883 | A | * | 7/1983 | Williamson et al. | ............ 429/97 |
| 7,855,008 | B2 | * | 12/2010 | Hakunti et al. | ................ 429/100 |
| 2004/0228074 | A1 | * | 11/2004 | Tu et al. | ......................... 361/679 |
| 2010/0216005 | A1 | * | 8/2010 | Zeng | .............................. 429/100 |

FOREIGN PATENT DOCUMENTS

JP   2000269655 A  *  9/2000

* cited by examiner

*Primary Examiner* — Barbara Gilliam
*Assistant Examiner* — Edu E Enin-Okut
(74) *Attorney, Agent, or Firm* — Altis Law Group, Inc.

(57) ABSTRACT

A battery cover mechanism includes a body member, a battery cover and an operating piece. The body member defines a receiving cavity recessed therefrom for receiving the battery cover and a battery therein. The battery cover is rotatably assembled to the body member to cover the receiving cavity of the body member. The operating piece is releasably assembled to the battery cover for locking the battery cover to the body member and unlocking the battery cover. The battery cover mechanism is convenience to operate, and avoids the interfering signals efficiently.

17 Claims, 6 Drawing Sheets

US 8,257,852 B2

BATTERY COVER MECHANISM

BACKGROUND

1. Technical Field

The exemplary disclosure generally relates to battery cover mechanisms, and particularly, to a battery cover mechanism used in a portable electronic device.

2. Description of Related Art

Batteries are widely used in portable electronic devices, such as personal digital assistants (PDAs), mobile phones, and etc. Conventional batteries are detachably received in the portable electronic device. A battery cover mechanism is designed to secure to a housing of the portable electronic devices to package the batteries, so as to protect the battery and inner circuits of the portable electronic devices from damage of external force.

A conventional battery cover mechanism generally includes a cover and a housing. The cover tightly engages with the housing to be secured thereon. However, due to the tight engagement of the cover and the housing in many conventional designs, a significant amount of friction exists between the cover and the housing. As a result, the user may need to apply a significant amount of strength to assemble/disassemble the cover to/from the housing. Furthermore, the battery cover needs to be detached from the housing to replace a battery. After replacing the battery, user may forget to reassemble the cover to the housing; as a result the cover may be lost or misplaced.

Therefore, there is room for improvement within the art.

BRIEF DESCRIPTION OF THE DRAWINGS

Many aspects of the exemplary battery cover mechanism can be better understood with reference to the following drawings. These drawings are not necessarily drawn to scale, the emphasis instead being placed upon clearly illustrating the principles of the present battery cover mechanism. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
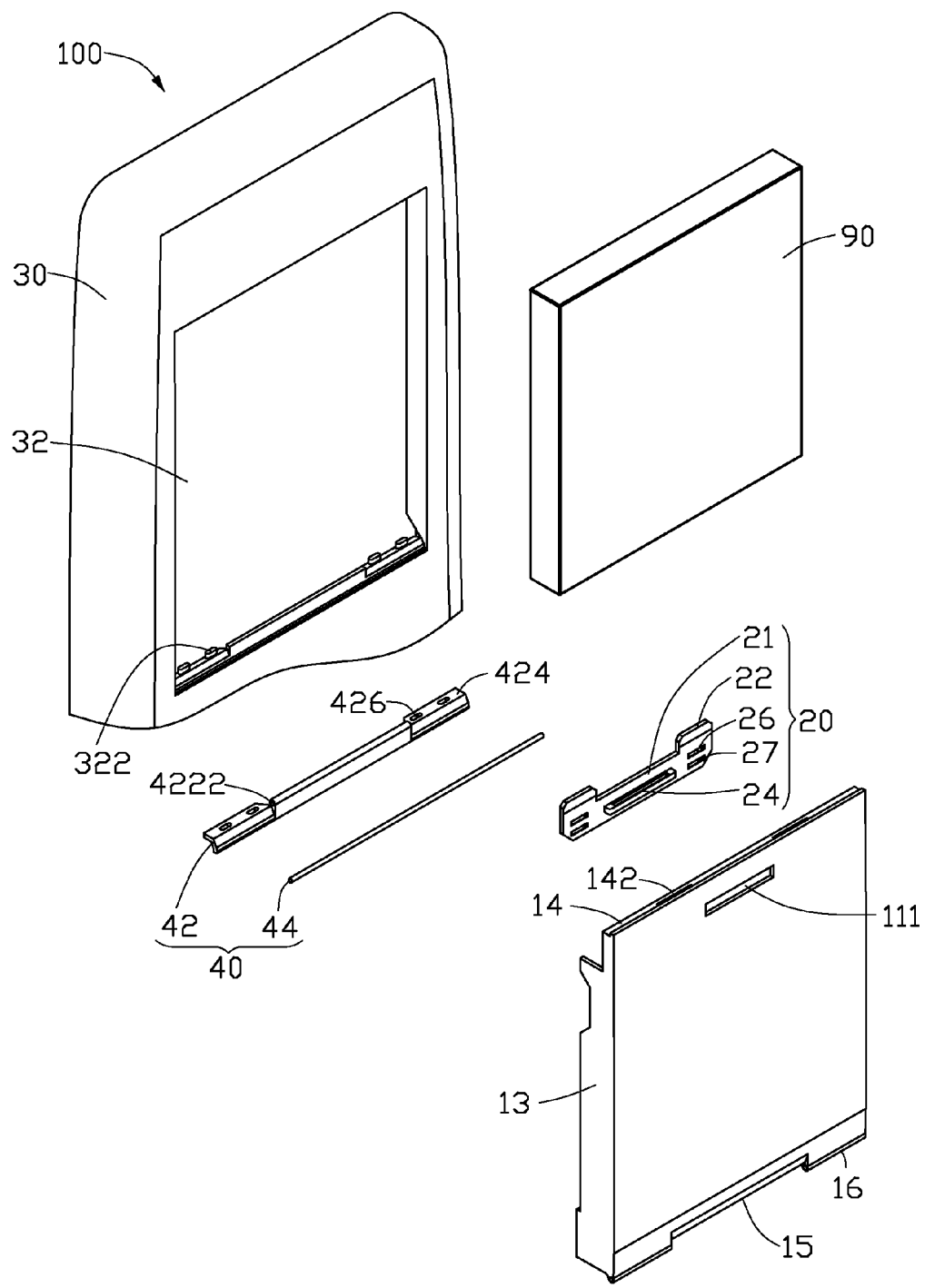
FIG. 1 shows an exploded, perspective view of a battery cover mechanism, in accordance with an exemplary embodiment.
Figure 2:
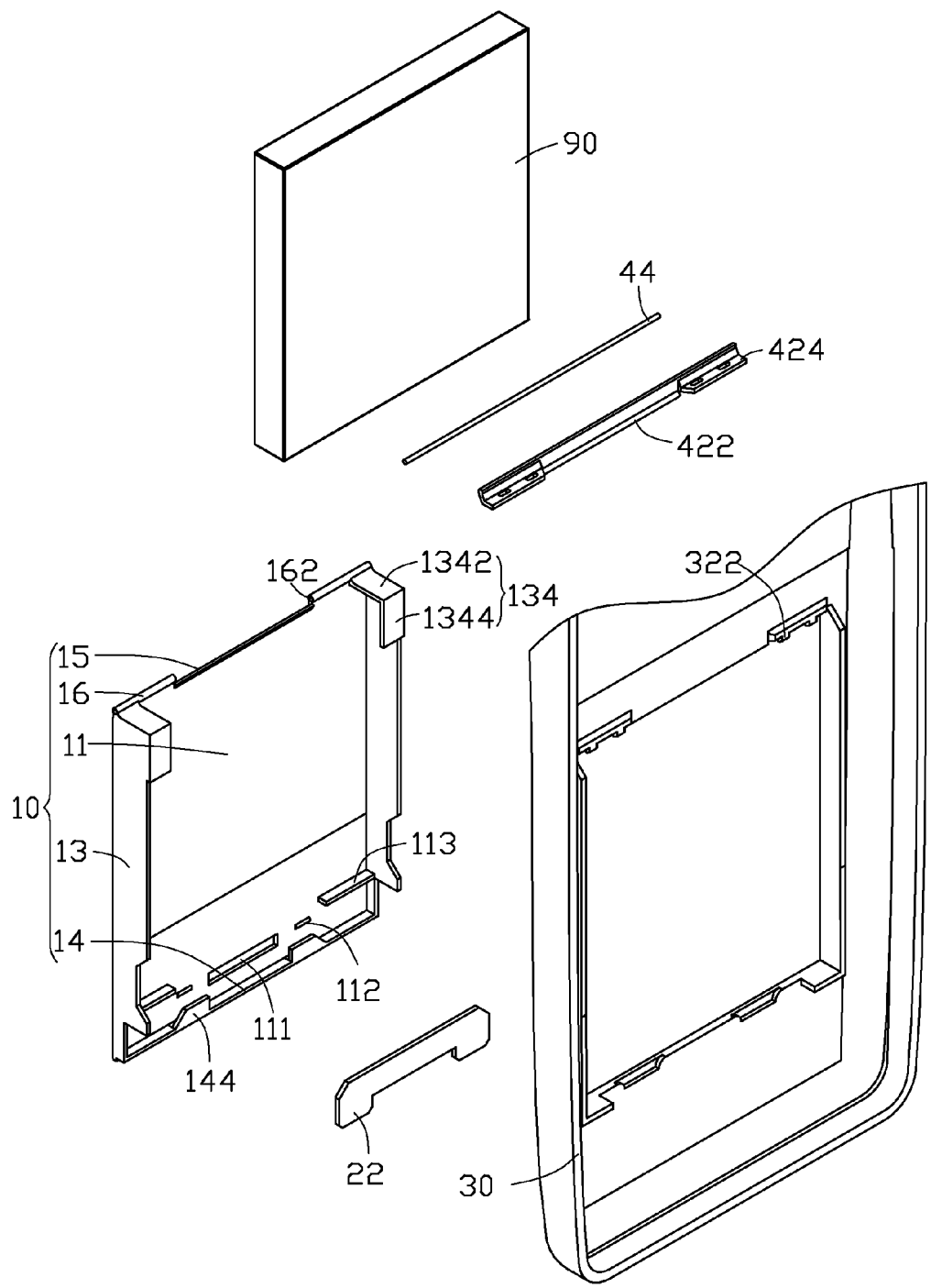
FIG. 2 is similar to FIG. 1, but shown in another view angle.
Figure 3:
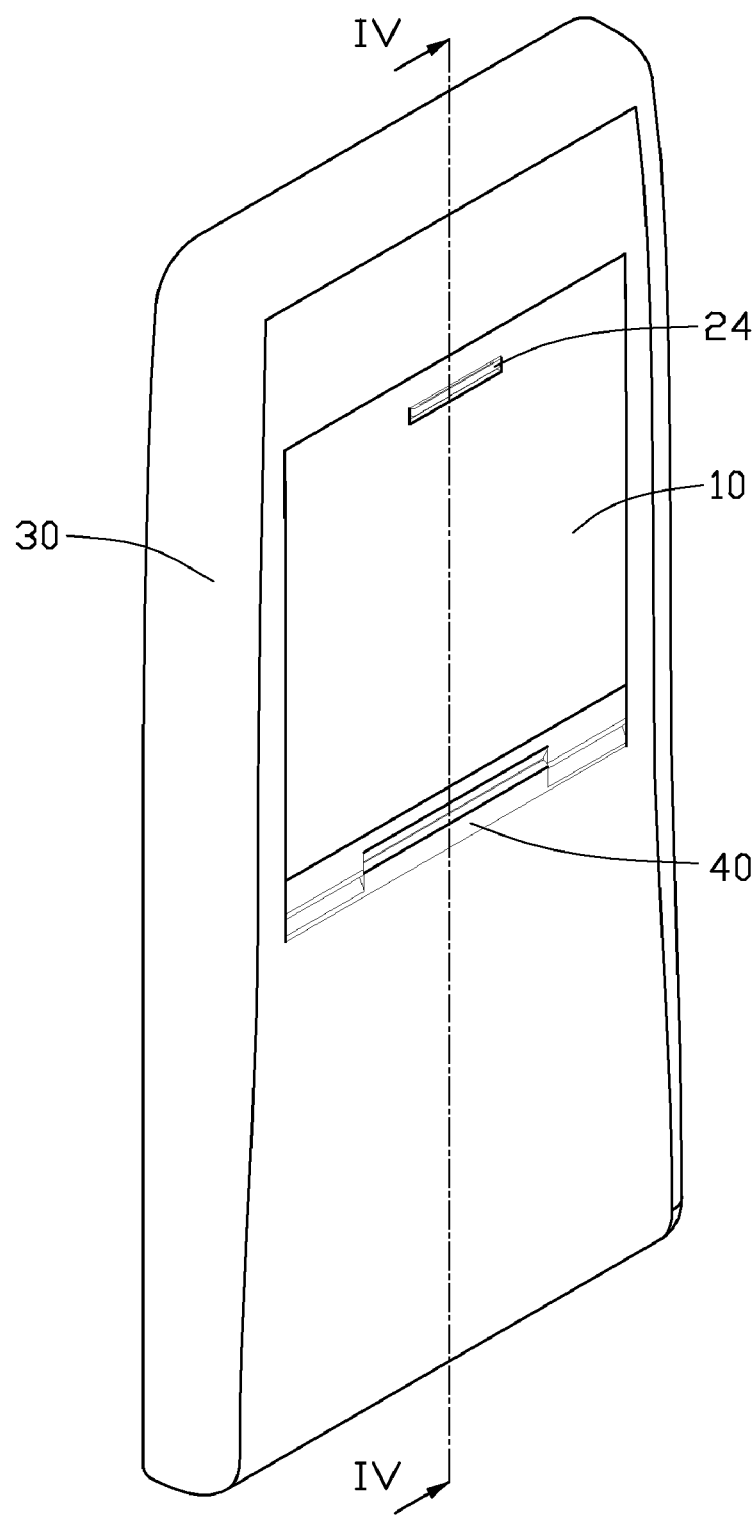
FIG. 3 shows an assembled, perspective view of the battery cover mechanism.

FIG. 1 through FIG. 2 both show an explored, perspective view of an exemplary battery cover mechanism 100 for packaging a battery 90 therein. The battery cover mechanism 100 is suitable for being used in a portable electronic device (not shown), such as a mobile phone, a personal digital assistant, a digital camera and etc. The battery cover mechanism 100 includes a battery cover 10, an operating piece 20, a body member 30 and a connecting assembly 40.

The battery cover 10 includes a top wall 11, two sidewalls 13 and an end wall 14. The two sidewalls 13 perpendicularly connect to two opposite edges of the top wall 31. The end wall 14 extends from one end of the top wall 11 perpendicularly with two ends thereof connected to the two sidewalls 13 respectively. The top wall 11 includes a slot 111, two locking blocks 112, and two holding boards 113 arranged thereon. The slot 111 is substantially rectangular, and is defined in the top wall 11 adjacent to the end wall 14. The two locking blocks 112 protrude from the top wall 11 and are positioned at opposite sides of the slot 111 parallel to the end wall 14. The two holding boards 113 are disposed at two sides of the top wall 11 adjacent to the end wall 14 and positioned at the outside of the two locking blocks 112 respectively. A gap 15 is defined through the opposite end of the top wall 11. Two curled portions 16 are formed at the two sides of the gap 15 of the top wall 11 and are arranged in line with the gap 15. Each curled portion 16 defines a first through hole 162 therethrough parallel to the end wall 14.

Each sidewall 13 includes a latching portion 134 disposed at an end thereof far away from the end wall 14 and opposite to the corresponding holding board 113. Thereby, the top wall 11, the two sidewalls 13, the two latching portions 134 and the two holding boards 113 cooperatively form a receiving space (not labeled) for accommodating the battery 90 therein. In the exemplary embodiment, each latching portion 134 is substantially L-sheet shaped perpendicularly extending from an outer edger of the sidewall 13. The latching portion 134 includes a first sheet body 1342 and a second sheet body 1344 perpendicular to the first sheet body 1342. The first sheet body 1342 extends from the sidewall 13 perpendicularly, adjacent to the curled portion 16 and parallel to the end wall 14. The second sheet body 1344 is parallel to the top wall 11. As the battery 90 is assembled to the battery cover 10, one end of the battery 90 is inserted into the receiving space of the battery cover 10 and latched by the two latching portions 134, the opposite end of the battery 90 is pressed and resists on the corresponding holding boards 113. Thus, the battery 90 is tightly assembled within the receiving space of the battery cover 10. The end wall 14 has two openings 142 and two end stops 144 arranged thereon. The two openings 142 are spaced defined in the end wall, and substantially positioned at opposite sides of the slot 111. The two end stops 144 spaced extend and bend from the end wall 14, parallel to the top wall 11 corresponding to the two openings 142 respectively.

The operating piece 20 is slidably mounted on the battery cover 10 and is configured for releasing or locking the battery cover 10 from or to the body member 30. The operating piece 20 includes a main body 21, two latching blocks 22, an operating portion 24, two first locating grooves 26 and two second locating grooves 27. The main body 21 is a substantially rectangular board. The two latching blocks 22 are disposed at two ends of one side of the main body 21 respectively, corresponding to the two openings 142 of the end wall 14. The operating portion 24 is substantially bar shape, and protrudes from one surface of the main body 21 corresponding to the slot 111 of the top wall 11 of the battery cover 10. The width of the operating portion 24 is smaller than the width of the slot 111 such that the operating portion 24 can be slidably assembled within the slot 111 of the top wall 11. The two first locating grooves 26 are recessed from the main body 21 and positioned at two sides of the operating portion 24 corresponding to the two locking blocks 112 of the battery cover 10. The two second locating grooves 27 are disposed on the main body 21 parallel to the corresponding two first locating grooves 26 respectively.

Figure 4:
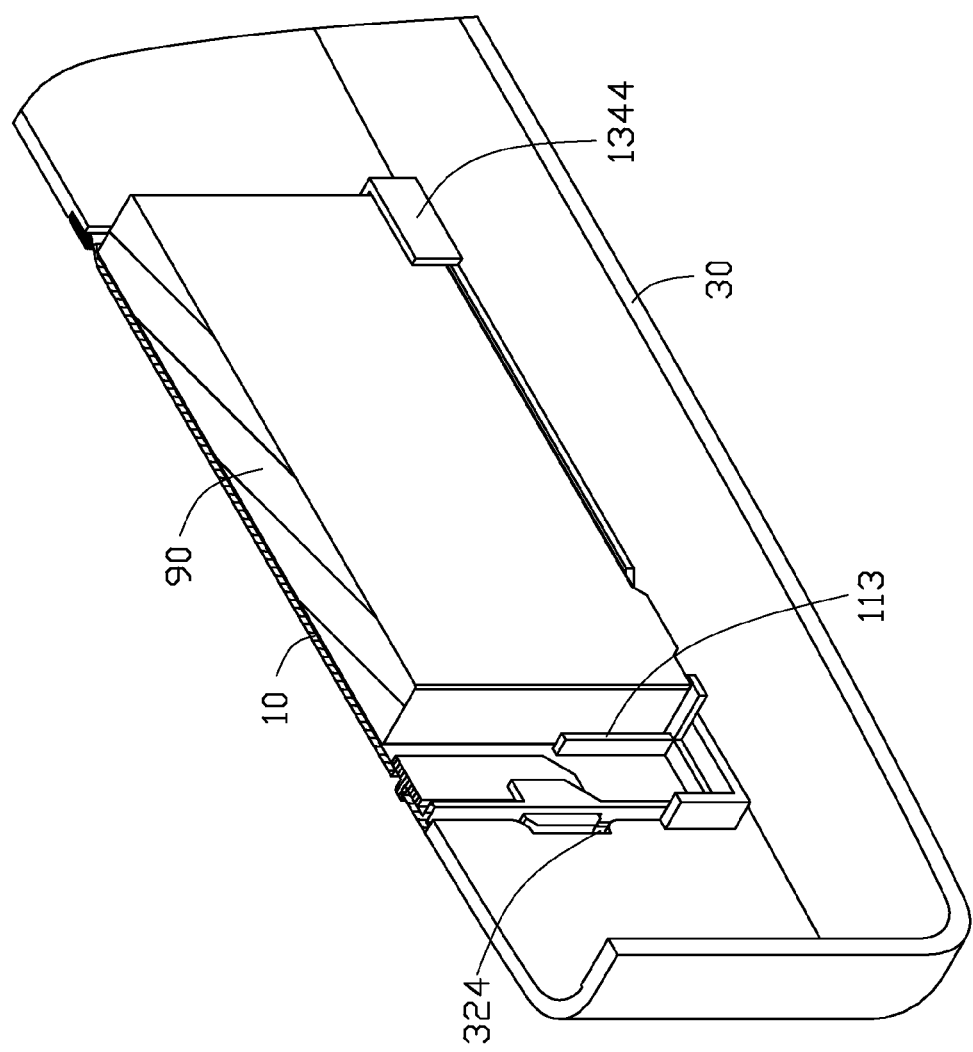
FIG. 4 shows a cross-section of the battery cover mechanism of FIG. 3 taken along line IV-IV.
Figure 5:
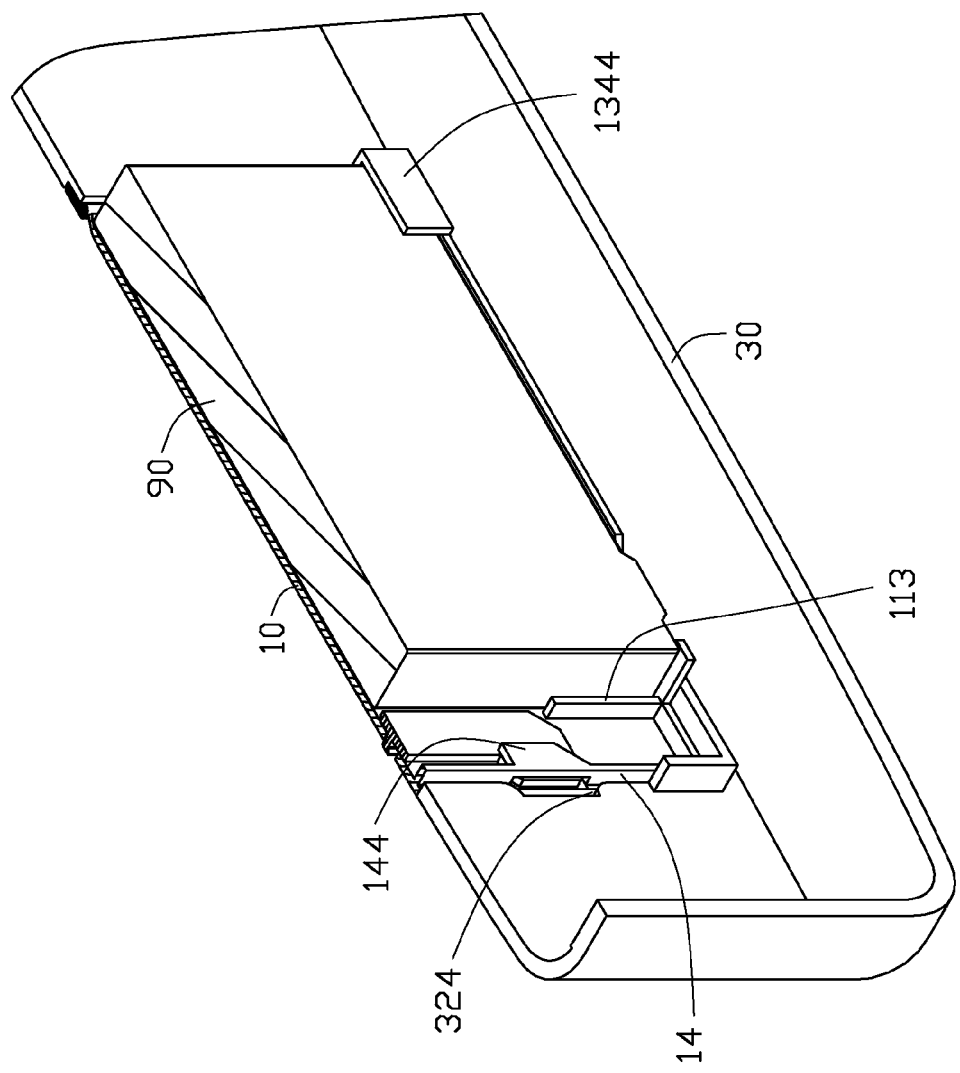
FIG. 5 shows a cross-section of the battery cover mechanism similar to FIG. 4, wherein, an operating piece is slided to release a battery cover.
Figure 6:
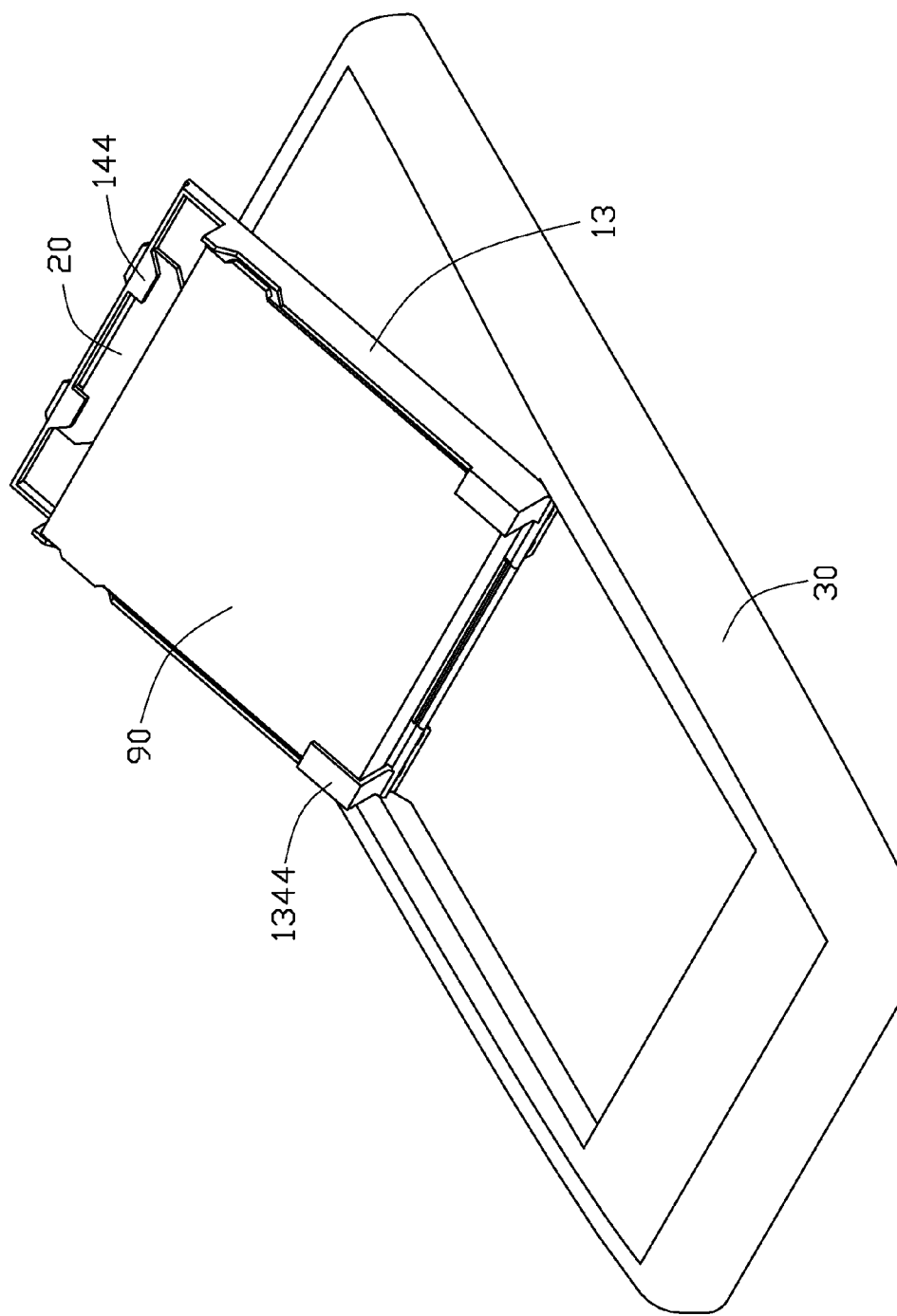
FIG. 6 shows a perspective view of the battery cover mechanism, wherein the battery cover is opened relative to the housing.

Also referring to FIG. 4 and FIG. 5, the body member 30 may be a housing of a portable electronic device. The body member 30 defines a receiving cavity 32 recessed therefrom for receiving the battery cover 10 and the battery 90 therein. The receiving cavity 32 includes several fixing portions 322 protruding from an inner sidewall thereof. Two notches 324 are spaced defined through an opposite inner sidewall of the receiving cavity 32 corresponding to the two latching blocks 22 of the operating piece 20 respectively.

The connecting assembly 40 is configured to rotatably assemble the battery cover 10 to the body member 30. The connecting assembly 40 includes a connecting body 42 and a shaft 44 rotatably assembled to the connecting body 42. The connecting body 42 is a substantially bar shaped board. The connecting body 42 includes a cylinder shaped connecting post 422 longitudinally protruding from a middle portion thereof, corresponding to the gap 15 of the battery cover 10. A second through hole 4222 is defined through the connecting post 422 axially. Two connecting portions 424 are formed at two ends of the connecting body 42 respectively, extending outward perpendicularly to the connecting post 422. Each connecting portion 424 defines several fixing holes 426 therethrough corresponding to the fixing portions 322 of the body member 30 respectively. In the exemplary embodiment, the connecting body 42 is fixed to the body member 30 by the welding of the fixing portions 322 into the fixing holes 426 respectively.

Referring FIG. 3 through FIG. 6, in assembly, the connecting body 42 is assembled to the battery cover 10 with the connecting post 422 being accommodated within the gap 15 of the battery cover 10 and in line with each other. The shaft 44 penetrates through one first through hole 162 of the battery cover 10, the second through hole 4222 of the connecting body 42 and the other first through hole 162 in turn; such that, the connecting body 42 is rotatably assembled to the battery cover 10. Then, the connecting body 42 is fixed to the body member 30 by the welding of the fixing portions 322 into the fixing holes 426 respectively; thereby, the battery cover 10 is rotatably assemble to the body member 10 via the connecting assembly 40. After that, the operating piece 20 is slidably assembled to the battery cover for releasing and locking the battery cover 10 from and to the body member 30. The two latching blocks 22 penetrate through the corresponding two openings 142 of the battery cover 10 respectively. The operating portion 24 inserts into the corresponding slot 111 and partially exposes from the corresponding slot 111 toward the opposite side thereof. The two locking blocks 112 latch into the corresponding two first locating grooves 26 respectively simultaneously, then, finishing the assembly of the battery cover mechanism 100.

When assembling the battery 90 to the battery cover mechanism 100, one end of the battery 90 is inserted into the receiving space of the battery cover 10 and latched by the two latching portions 134. The opposite end of the battery 90 is pressed and resists on the corresponding holding boards 113 to secure the battery 90 within the receiving space of the battery cover 10 tightly. After that, the battery cover 10 is rotated toward and accommodated within the receive cavity 32 of the body member 30. The operating portion 24 is pushed/moved toward the direction far away from the connecting assembly 40 to make the locking blocks 112 detach from the first locating grooves 26 and latch into the corresponding second locating grooves 27. The two latching blocks 22 latch into the corresponding two notches 324 of the body member 30 simultaneously, thus, the battery cover 10 with battery 90 attached thereto is secured to the body member 30 tightly.

When need to replace the battery 90, the operating portion 24 is released toward the connecting assembly 40. The locking blocks 112 is detached from the second locating grooves 27 and latch into the corresponding first locating grooves 26. Meanwhile, the two latching blocks 22 disengage from the two notches 324. The battery cover 10 can be rotated to open relative to the body member 30. Due to a securing of the battery 90 to the battery cover 10, the battery 90 is exposed to be easily replaced. In addition, due to the battery cover 10 pivotally assembled to the body member 30, the battery cover 10 cannot be lost.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery cover mechanism, configured to secure a battery therein, comprising:
a body member defining a receiving cavity recessed therein;
a battery cover rotatably assembled to the body member to package the battery within the receiving cavity, the battery cover including a top wall with a slot defined therethrough, the top wall further including two locking blocks disposed at the two sides of the slot; and
an operating piece including two first locating grooves and two second locating grooves, the two locking blocks selectively latching into the corresponding first locating grooves and the second locating grooves for locking the battery cover to the body member and unlocking the battery cover.

2. The battery cover mechanism as claimed in claim 1, wherein the operating piece includes a main body and an operating portion protruding therefrom; the main body is mounted on the top wall; the operating portion penetrates through and is slidably assembled within the slot of the top wall to control the operating piece.

3. The battery cover mechanism as claimed in claim 2, wherein the battery cover further includes an end wall formed at one end thereof adjacent to the slot; two openings are spaced defined through the end wall and positioned at the two sides of the slot; one inner sidewall of the receiving cavity spaced defines two notches therein corresponding to the two openings; the operating piece further includes two latching blocks disposed at the two ends of the main body for releasably latch into the corresponding notches of the body member.

4. The battery cover mechanism as claimed in claim 2, wherein the two first locating grooves and two second locating grooves are recessed in the main body and are at the same side with the operating portion; the two first locating grooves are positioned at the two sides of the operating portion, the two second locating grooves are disposed parallel and spaced to the corresponding two first locating grooves respectively.

5. The battery cover mechanism as claimed in claim 3, wherein the top wall further includes two sidewalls connecting to the two opposite sides of the top wall parallel to each other; two holding boards are disposed on the top wall adjacent to the end wall; two latching portions are disposed at the opposite end of the top wall to together form a receiving space with the top wall, the two sidewalls and the two holding boards; the battery is assembled within the receiving space of the battery cover.

6. The battery cover mechanism as claimed in claim 1, wherein the battery cover mechanism further includes a connecting assembly configured to rotatably assemble the battery cover to the body member; the connecting assembly includes a connecting body and a shaft; the connecting body is fixed to the body member and includes a through hole therethrough; the shaft rotatably penetrates through the through hole of the connecting body and is fixed to the battery cover with ends thereof.

7. The battery cover mechanism as claimed in claim 6, wherein the connecting body includes a cylinder shaped connecting post with the through hole defined therethrough axially and two connecting portions formed at two ends of the connecting post; each connecting portion defines several fixing holes therethrough; the receiving cavity defines several fixing portion configured to fix with the connecting body by the welding of the fixing portions into the fixing holes respectively.

8. The battery cover mechanism as claimed in claim 7, wherein another end of the top wall opposite to the end wall defines a gap therethrough and two curled portions formed at the two sides of the gap; the two ends of the shaft are fixed to the two curled portions of the top wall respectively.

9. The battery cover mechanism as claimed in claim 1, wherein the body member is a housing of a portable electronic device.

10. A battery cover mechanism comprising:
a body member defining a receiving cavity recessed therefrom;
a battery cover configured to attach a battery thereto and rotatably assemble to the body member to cover the receiving cavity of the body member, the battery cover including a top wall with a slot defined therethrough, the top wall further including two locking blocks disposed at the two sides of the slot; and
an operating piece slidably mounted on the battery cover and the operating piece including two first locating grooves and two second locating grooves, the two locking blocks selectively latching into the corresponding first locating grooves and the second locating grooves configured for releasing the battery cover from the body member and locking the battery cover thereto.

11. The battery cover mechanism as claimed in claim 10, wherein two sidewalls formed at the two opposite sides of the top wall and an end wall extending from one end of the top wall; the top wall includes two holding boards disposed at the two sides there of adjacent to the end wall and two latching portions disposed at another end thereof opposite to the end wall; the top wall, the two sidewalls, the two latching portions and the two holding boards together form a receiving space for accommodating the battery therein.

12. The battery cover mechanism as claimed in claim 11, wherein the operating piece includes a main body and an operating portion protruding therefrom; the main body is mounted on the top wall; the operating portion penetrates through and is slidably assembled within the slot of the top wall to control the operating piece.

13. The battery cover mechanism as claimed in claim 11, wherein two openings are spaced defined through the end wall and positioned at the two sides of the slot; one inner sidewall of the receiving cavity spaced defines two notches therein corresponding to the two openings; the operating piece further includes two latching blocks disposed at the two ends of the main body for releasably latch into the corresponding notches of the body member.

14. The battery cover mechanism as claimed in claim 12, wherein the two first locating grooves and two second locating grooves are recessed in the main body and are at the same side with the operating portion; the two first locating grooves are positioned at the two sides of the operating portion, the two second locating grooves are disposed parallel and spaced to the corresponding two first locating grooves respectively.

15. A battery cover mechanism comprising:
a body member defining a receiving cavity recessed therefrom;
a battery cover configured to attach a battery thereto and rotatably assemble to the body member to cover the receiving cavity of the body member, the battery cover including at least one locking block; and
an operating piece slidably mounted on the battery cover, the operating piece including at least one first locating groove and at least one second locating groove, the at least one locking block selectively latching into the corresponding first locating groove and the second locating groove configured for releasing the battery cover from the body member and locking the battery cover thereto;
wherein the battery cover including a top wall, a slot is defined at one end of the top wall and there are two locking blocks are disposed at the two sides of the slot, the operating piece is slidably mounted on one end of the battery cover, the operating piece includes a main body and an operating portion integrally formed with the main body; the main body is mounted on the top wall; the operating portion penetrates through and is slidably assembled within the slot of the top wall to control the operating piece.

16. The battery cover mechanism as claimed in claim 15, wherein there are two first locating grooves and two second locating grooves recessed in the main body, the two first locating grooves are positioned at the two sides of the operating portion, the two second locating grooves are disposed parallel and spaced to the corresponding two first locating grooves respectively.

17. The battery cover mechanism as claimed in claim 15, wherein the main body is a rectangular board, and the operating portion protrudes from one surface of the main body.

* * * * *